United States Patent
Shim et al.

(10) Patent No.: US 7,253,987 B1
(45) Date of Patent: Aug. 7, 2007

(54) DISTURBANCE SIGNAL REDUCTION IN SERVO SYSTEMS

(75) Inventors: David Hyunchul Shim, Milpitas, CA (US); Jong-Min Lin, Cupertino, CA (US); Lin Guo, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 431 days.

(21) Appl. No.: 10/617,479

(22) Filed: Jul. 10, 2003

Related U.S. Application Data

(60) Provisional application No. 60/394,854, filed on Jul. 10, 2002.

(51) Int. Cl.
*G11B 5/596* (2006.01)

(52) U.S. Cl. .................................. 360/77.02

(58) Field of Classification Search ............ 360/77.02, 360/75, 77.04, 77.08; 318/561, 611, 615
See application file for complete search history.

(56) References Cited

U.S. PATENT DOCUMENTS

| | | | |
|---|---|---|---|
| 5,155,422 A * | 10/1992 | Sidman et al. ............ 360/77.04 |
| 6,538,839 B1 * | 3/2003 | Ryan ........................ 360/77.02 |
| 6,618,219 B1 * | 9/2003 | Ho ............................ 360/77.04 |
| 6,628,472 B1 * | 9/2003 | Ho ............................ 360/77.04 |
| 6,636,376 B1 * | 10/2003 | Ho ............................ 360/77.02 |
| 6,693,764 B1 * | 2/2004 | Sheh et al. ............... 360/77.08 |
| 6,798,611 B1 * | 9/2004 | Romano et al. ......... 360/77.04 |
| 2002/0093754 A1 * | 7/2002 | Zhang et al. ............. 360/77.04 |
| 2003/0128458 A1 * | 7/2003 | Ge et al. .................. 360/78.06 |

* cited by examiner

*Primary Examiner*—David Hudspeth
*Assistant Examiner*—James L Habermehl
(74) *Attorney, Agent, or Firm*—Tejpal S. Hansra

(57) ABSTRACT

A servo system includes a first member and a second member that is positionable relative to the first member. A position error signal causes the second member to be positioned at a desired location relative to the first member. The position error signal includes a position error due to a disturbance in the servo system, and the position error is reduced by attenuation of a disturbance signal as a non-linear function of the amplitude of the disturbance signal.

100 Claims, 5 Drawing Sheets

DISTURBANCE SIGNAL REDUCTION IN SERVO SYSTEMS

RELATED APPLICATION

This application claims priority from U.S. Provisional Application Ser. No. 60/394,854 entitled "Narrow-Band NRRO Reduction Using a Nonlinear Filter" filed on Jul. 10, 2002 which is incorporated herein by reference.

FIELD OF THE INVENTION

The present invention relates to reducing position errors due to disturbances in servo systems and, in particular, to reducing disturbance signals in disk drive servo systems.

BACKGROUND OF THE INVENTION

A disk drive is a data storage device that stores servo and user data in substantially concentric tracks on a data storage disk. During disk drive operation, the disk is rotated about an axis while a transducer reads data from and/or writes data to a target track of the disk. A servo loop positions the transducer above the target track while the data transfer occurs. The servo loop uses servo data read from the disk as position feedback to maintain the transducer in a substantially centered position above the target track.

The servo data includes magnetic flux transitions such that when the transducer passes over the flux transitions the transducer generates a read signal. The read signal can be demodulated and decoded to provide a position error signal that indicates the position of the transducer relative to a track. The position error signal is used by the servo loop to correct the position of the transducer relative to the track.

Disturbances in the disk drive can increase position errors by introducing disturbance signals into the position error signal. Such disturbances can have a variable amplitude at a very narrow frequency band. For example, non-repeatable run out (NRRO) is a random disturbance due to a rocking mode excited by imperfections of balls in the disk drive spindle motor bearing. The disturbance amplitude varies from disk drive to disk drive and from time to time.

Attempts have been made to reduce the position error in the position error signal that is due to disturbances such as NRRO. In one conventional approach, a notch filter attenuates narrow-band disturbance signals in the position error signal. In order to provide adequate attenuation, the notch filter has a sharp and deep decrease in gain around the frequency of the disturbance. The amount of notch is determined empirically. However, this approach has a number of drawbacks. First, there is always a fixed level of attenuation regardless of the disturbance level, which can vary significantly. Further, the disturbance may not occur in all disk drives, and not all the time. For example, there may be more disturbance due to temperature rise or other excitation effect/force. A conventional linear disturbance signal attenuator uses a notch filter to attenuate the disturbance signal even if there is no, or minimal, disturbance. This increases position error and lowers performance.

Further, a notch filter affects the error transfer function over the entire frequency range. (The error transfer function is the frequency response that determines the position error.) Because the resulting error transfer function is distorted by the notch filter from its highly optimized original shape, the performance is worse if the targeted disturbance is not present in the position error signal. Additionally, the fixed (linear) notch filter causes ringing in the steady-state response due to the exaggerated frequency response at the notch frequency.

As a compromise, some conventional servo controllers use a notch filter with very weak attenuation (around 3 dB). However, weak attenuation is insufficient when the disturbance is large. A notch filter for attenuating disturbances is further complicated because the notch frequency can fall on a phase cross-over frequency, where robustness constraints severely limit notch design.

Another conventional approach uses a state estimator with an internal model principle to estimate a torque disturbance form. The estimator is based on Kalman filter theory, requiring that statistical characteristics be known a priori to design the filter. However, this is also a linear system that suffers from similar problems as the notch filter. Such a linear system deteriorates the performance of the servo controller if the target disturbance is very small or not present.

Accordingly, there is a need for reducing the position error in a position error signal due to narrow-band disturbance that introduces a disturbance signal in the position error signal while maintaining servo controller performance.

SUMMARY OF THE INVENTION

The present invention addresses the above needs.

The present invention provides a servo system that includes a first member and a second member that is positionable relative to the first member. A position error signal causes the second member to be positioned at a desired location relative to the first member. Disturbances in the servo system introduce disturbance signals into the position error signal and position errors due to the disturbance signals are reduced by non-linear attenuation.

An embodiment includes selectively varying a disturbance signal in the position error signal as a function of the amplitude of the disturbance signal.

Another embodiment includes filtering the position error signal to selectively pass the disturbance signal, generating a correction signal having an amplitude that varies as a non-linear function of the amplitude of the disturbance signal, and combining the correction signal with the position error signal to generate a corrected position error signal for a servo controller, thereby enabling the servo controller to selectively react to the disturbance with varying amplitude.

Filtering the position error signal may include determining the frequency band of the disturbance signal and filtering the position error signal using a peak filter to selectively pass the disturbance signal. In another case, filtering the position error signal includes determining the frequency band and amplitude range of the disturbance signal, and filtering the position error signal using a peak filter based on the frequency band and amplitude range of the disturbance signal to selectively pass the disturbance signal.

Another embodiment provides a servo system having a servo loop that includes a servo controller that generates a position error signal causing the second member to be positioned at a desired location relative to the first member, and an attenuator that selectively reduces position errors due to disturbances by non-linear attenuation.

The attenuator includes a gain controller that selectively varies a disturbance signal in the position error signal as a non-linear function of the amplitude of the disturbance signal.

In one version, the gain controller selectively amplifies or attenuates the disturbance signal such that reduction of position errors increases as a non-linear function of the amplitude of the disturbance signal.

In another version, the attenuator includes a peak filter that filters the position error signal to selectively pass the disturbance signal, a gain controller that generates a correction signal having an amplitude that varies as a non-linear function of the amplitude of the disturbance signal, and a combiner that combines the correction signal with the position error signal to generate a corrected position error signal for the servo controller, thereby enabling the servo controller to selectively react to disturbances having varying amplitudes. The peak filter is based on the frequency band of the disturbance signal.

In yet another version of the servo system, the position error signal includes multiple peaks at different frequencies, and the attenuator includes a first filter that filters the position error signal to selectively pass a first disturbance signal at a first peak frequency, a first gain controller that generates a first correction signal having an amplitude that varies as a non-linear function of the amplitude of the first disturbance signal, a second filter that filters the position error signal to selectively pass a second disturbance signal at a second peak frequency, a second gain controller that generates a second correction signal having an amplitude that varies as a non-linear function of the amplitude of the second disturbance signal, and a combiner that combines the first and/or the second correction signals with the position error signal to generate a corrected position error signal with selectively varied disturbance signals in a non-linear manner.

Each attenuator can include a saturation controller that controls the output signal to preserve servo loop stability if the gain controller output increases above a threshold, and a deadzone controller that controls the output signal to maintain servo controller performance if the amplitude of the disturbance signal decreases below a threshold.

Other objects, embodiments, features and advantages of the invention will be apparent from the following description taken in conjunction with the following drawings.

DETAILED DESCRIPTION OF THE INVENTION

Figure 1:
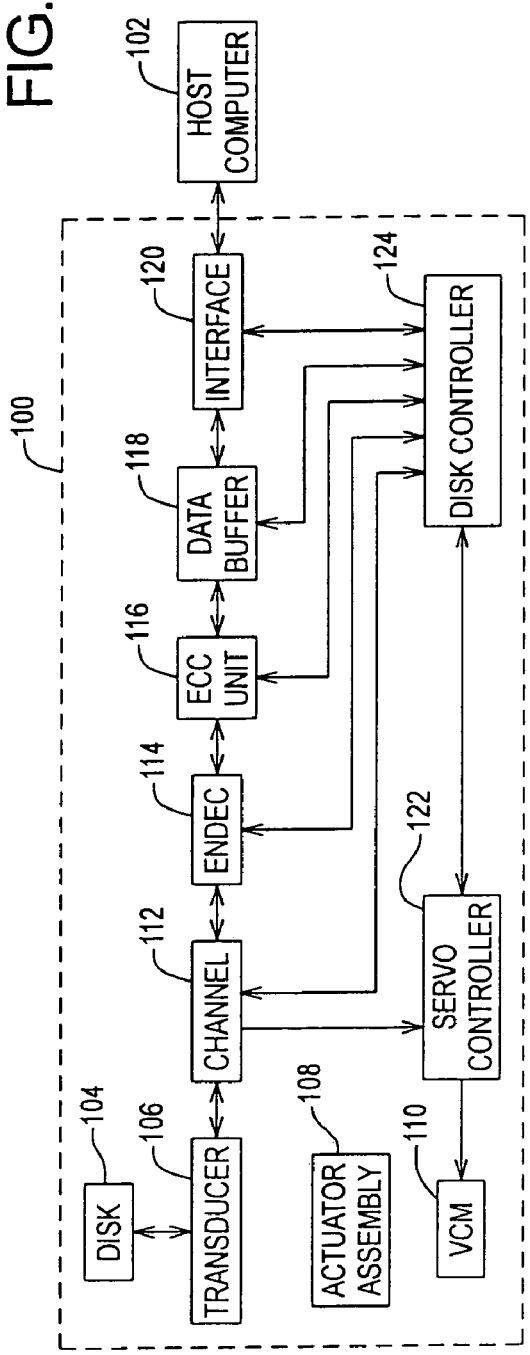
FIG. 1 shows a disk drive that implements the present invention.

While this invention is susceptible of embodiments in many different forms, the preferred embodiments are shown in the drawings and will be described in detail, with the understanding that the present disclosure is an exemplification of the principles of the invention and is not intended to limit the broad aspects of the invention to the embodiments illustrated.

FIG. 1 illustrates a disk drive 100 implementing aspects of the present invention. The disk drive 100 performs data storage and retrieval functions for an external host computer 102. The disk drive 100 includes a data storage disk 104, a transducer 106, an actuator assembly 108, a voice coil motor (VCM) 110, a read/write channel 112, an encoder/decoder (ENDEC) 114, an error correction coding (ECC) unit 116, a data buffer 118, an interface 120, a servo controller 122 and a disk controller 124.

In general, the disk 104 includes one or two disk surfaces (not shown) which are coated with magnetic material capable of changing its magnetic orientation in response to an applied magnetic field. Data is stored digitally in magnetic polarity transitions (frequently referred to as pulses in cells) within concentric tracks on the disk surface(s). The disk 104 is rotated at a substantially constant spin rate by a spindle motor (not shown) that is speed-controlled by a closed-loop feedback system. Instead of the single disk 104, the disk drive 100 can include multiple disks 104 each mounted on a single spindle and serviced by one or more separate transducers 106.

The transducer 106 transfers information to and from the disk 104 during read and write operations. The transducer 106 is positioned over the disk 104 by the actuator assembly 108 that pivots about an axis under the power of the VCM 110. During a write operation, a polarity-switchable write current is delivered to the transducer 106 from the channel 112 to induce magnetic polarity transitions onto a desired track of the disk 104. During a read operation, the transducer 106 senses magnetic polarity transitions on a desired track of the disk 104 to create an analog read signal that is indicative of the data stored thereon. The transducer 106 is commonly a dual element head having a magneto-resistive read element and an inductive write element.

The VCM 110 receives movement commands from the servo controller 122 for properly positioning the transducer 106 above a desired track of the disk 104 during read and write operations. The servo controller 122 is part of a servo loop that uses servo information from the disk 104 to control the movement of the transducer 106 and the actuator assembly 108 in response to commands from the disk controller 124. The servo controller 122 minimizes tracking errors.

During a read operation, the channel 112 receives the read signal from the transducer 106 and processes the read signal to create digital data representative of the data stored on the disk 104. The channel 112 typically includes detection circuitry and a read clock for deriving timing information from the read signal.

The disk controller 124 is a microprocessor that controls the operation and timing of other components in the disk drive 100. In addition, the disk controller 124 may perform the functions of some of these components. For example, the disk controller 124 may perform computation for the servo controller 122.

The transducer 106 generates a read signal in response to servo data on the disk 104 and the read signal is converted by an analog-to-digital converter in the channel 112 into digital data representing the amplitude of the read signal. The servo controller 122 and/or the disk controller 124 demodulates the digital data to determine position information for the transducer 106 and provides servo control signals to the VCM 110 for positioning the transducer 106 during seek and on-track operations. Thus, in a servo loop the VCM 110 moves the transducer 106 and the actuator assembly 108 in response to the servo bursts.

After a seek operation to a target track, the servo loop uses the servo data to generate a position error signal to maintain the transducer 106 over the target track during an on-track operation.

Disturbances in the servo system introduce disturbance signals into the position error signal. Advantageously, the servo controller 122 attenuates position errors due to narrow-band disturbances in the position error signal.

Figure 2:
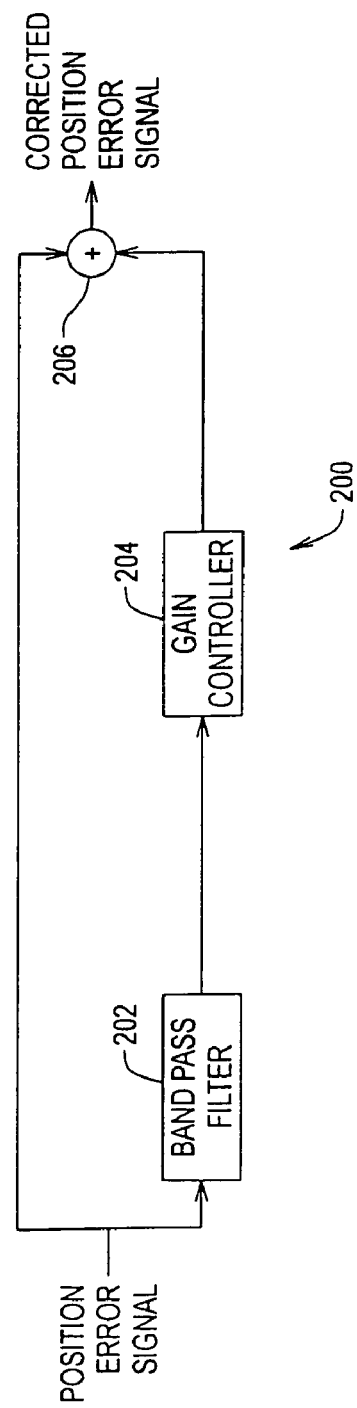
FIG. 2 shows an attenuator for non-linear filtering of a narrow-band disturbance signal in a position error signal of the disk drive.

FIG. 2 shows an attenuator 200 for non-linear filtering of a narrow-band disturbance signal in a position error signal of the disk drive 100. In other words, the attenuator 200 attenuates position error due to narrow-band disturbance in the position error signal.

The attenuator 200 is located in the servo controller 122 and includes a band pass filter 202, a gain controller 204 and a combiner 206.

The band pass filter 202 filters the position error signal and passes the disturbance signal in the position error signal to the gain controller 204. The gain controller 204 performs non-linear attenuation on the disturbance signal and passes a correction signal to the combiner 206. The combiner 206 combines the position error signal and the correction signal to provide a corrected position error signal.

The disturbance is NRRO that occurs in a rocking mode of the disk drive 100. The NRRO creates the position error in the position error signal as the disturbance signal in the position error signal.

The band pass filter 202 is a peak filter that passes only a selected narrow-band frequency range of the position error signal that includes the disturbance signal. The band pass filter 202 narrow-band frequency range is determined by examining the frequency range of the disturbance. For example, the base frequency of the disturbance is determined by disk geometry, form factor, materials, components, etc. The disturbance frequency range is determined by industry standard measurements such as spectrum analysis software. Then the band pass filter 202 is designed using the industry standard measurements. As a result, the attenuator 200 is tuned for a particular disk drive product. Furthermore, the attenuator 200 can be tuned from disk drive to disk drive.

The gain controller 204 provides a non-linear gain function that adjusts the attenuation of the disturbance signal in response to the amplitude (magnitude) of the disturbance signal. Preferably, the non-linear gain function is an odd function where the product of positive and negative inputs is negative.

An example non-linear gain function is a cubic function $f(u)$ having tunable parameters M, N according to the relation:

$$f(u) = M\left(\frac{u}{N}\right)^3 \quad (1)$$

The parameters M, N are selected to signify the effect of the cubic function $f(u)$ when there is a strong disturbance at the target disturbance frequency but not when there is a weak disturbance at the target disturbance frequency. The parameter N is based on the amplitude of the disturbance signal (u) and is the threshold level of signal increase/decrease. If the disturbance signal amplitude u is smaller than N then the ratio u/N is reduced when cubed. On the other hand, if the disturbance signal amplitude u is greater than N then the ratio u/N is increased when cubed. Thus, the cubic function $f(u)$ selectively amplifies or attenuates the disturbance signal depending on the ratio u/N. Likewise, the cubic function $f(u)$ provides variable gain and resulting variable attenuation of the position error signal.

The cubic function $f(u)$ has several notable effects. First, the cubing operation redistributes the energy of the input signal by creating third harmonics at triple the base frequency. Second, the ratio u/N is increased or decreased if the absolute value of u/N is larger or smaller than 1, respectively.

The parameter M adjusts the overall amplification of the value $(u/N)^3$. Therefore, if the disturbance signal is weak then the amplification by the cubic function $f(u)$ is low and the disturbance signal has essentially no effect on the corrected position error signal or the servo system. That is, the corrected position error signal is essentially the position error signal. However, if the disturbance signal is strong then the amplification by the cubic function $f(u)$ is high and the disturbance signal substantially effects the corrected position error signal. That is, the corrected position error signal differs substantially from the position error signal.

The cubic function $f(u)$ has non-linear gain that is confined to a narrow frequency band due to the band pass filter 202. For example, in a rocking mode for the disk drive 100 the third harmonics around 6 KHz are attenuated by −40 dB/dec.

The combiner 206 is a summing node.

Figure 3A:
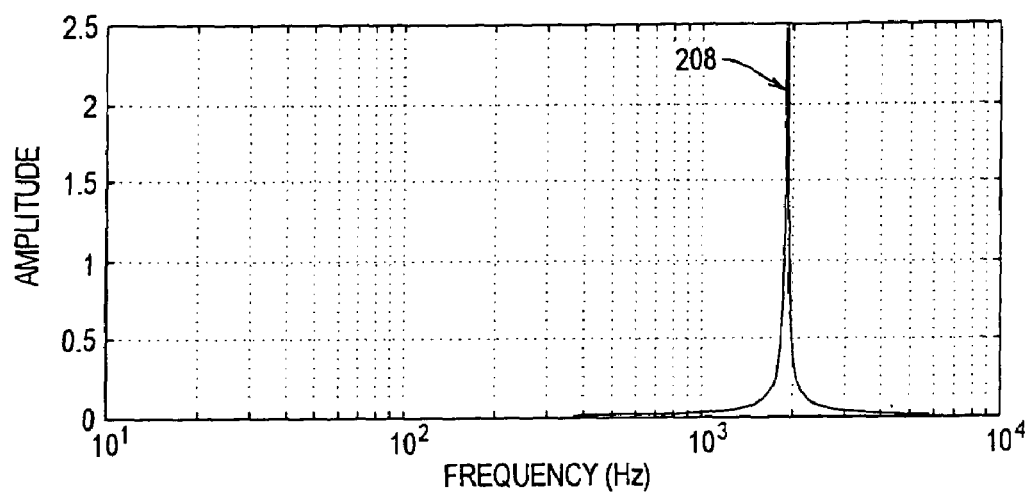
FIGS. 3A–3B show amplitude and phase plots, respectively, of the frequency response of a band pass filter in the attenuator.
Figure 3B:
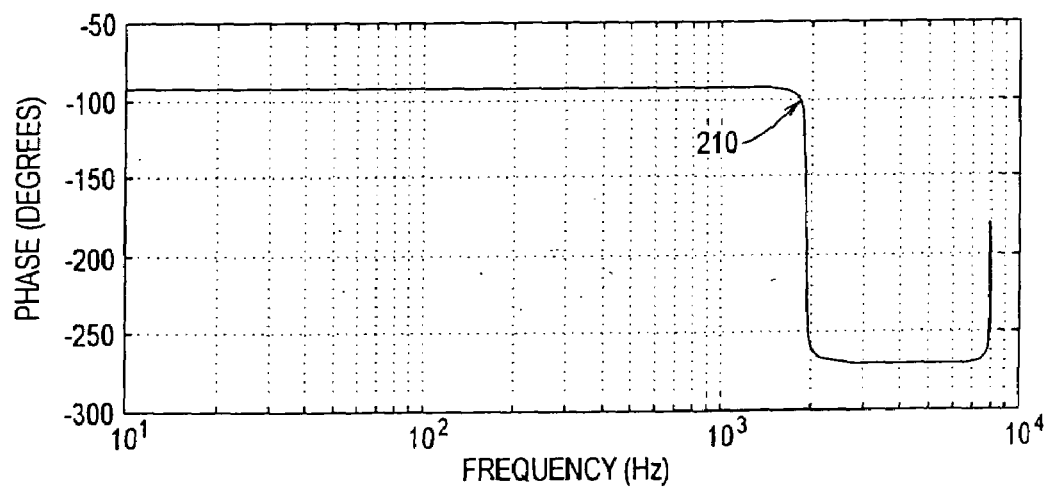

FIGS. 3A–3B show an amplitude plot 208 and a phase plot 210, respectively, of the frequency response of the band pass filter 202. As is seen, the band pass filter 202 has a narrow-band frequency range at about 1.9 KHz.

Figure 4:
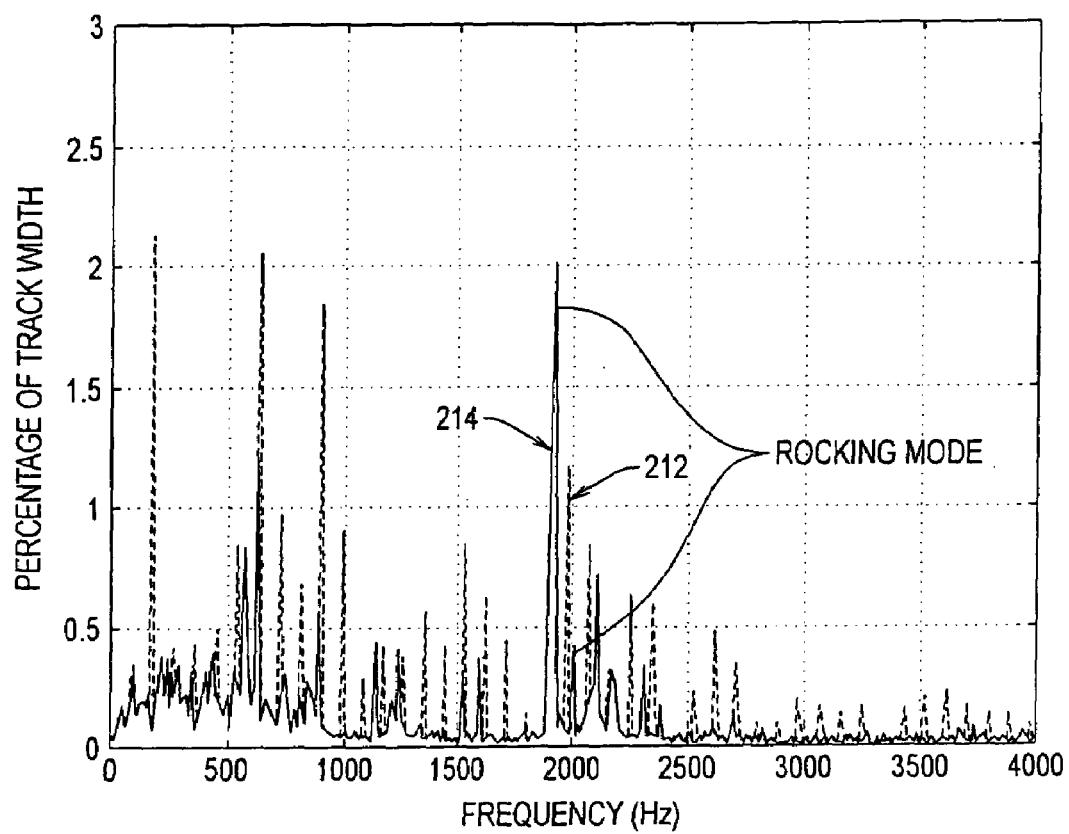
FIG. 4 shows a decomposition plot for the position error signal where a disturbance signal due to a rocking mode of the disk drive is unattenuated.

FIG. 4 shows a decomposition plot for the position error signal in the disk drive 100 where the disturbance signal is unattenuated. The decomposition plot is a Fourier Transform of the position error signal that includes a repeatable run out (RRO) disturbance signal 212 and an NRRO disturbance signal 214. As is seen, the RRO disturbance signal 212 and the NRRO disturbance signal 214 are pronounced within the rocking mode frequency range at about 1.9 KHz.

Figure 5:
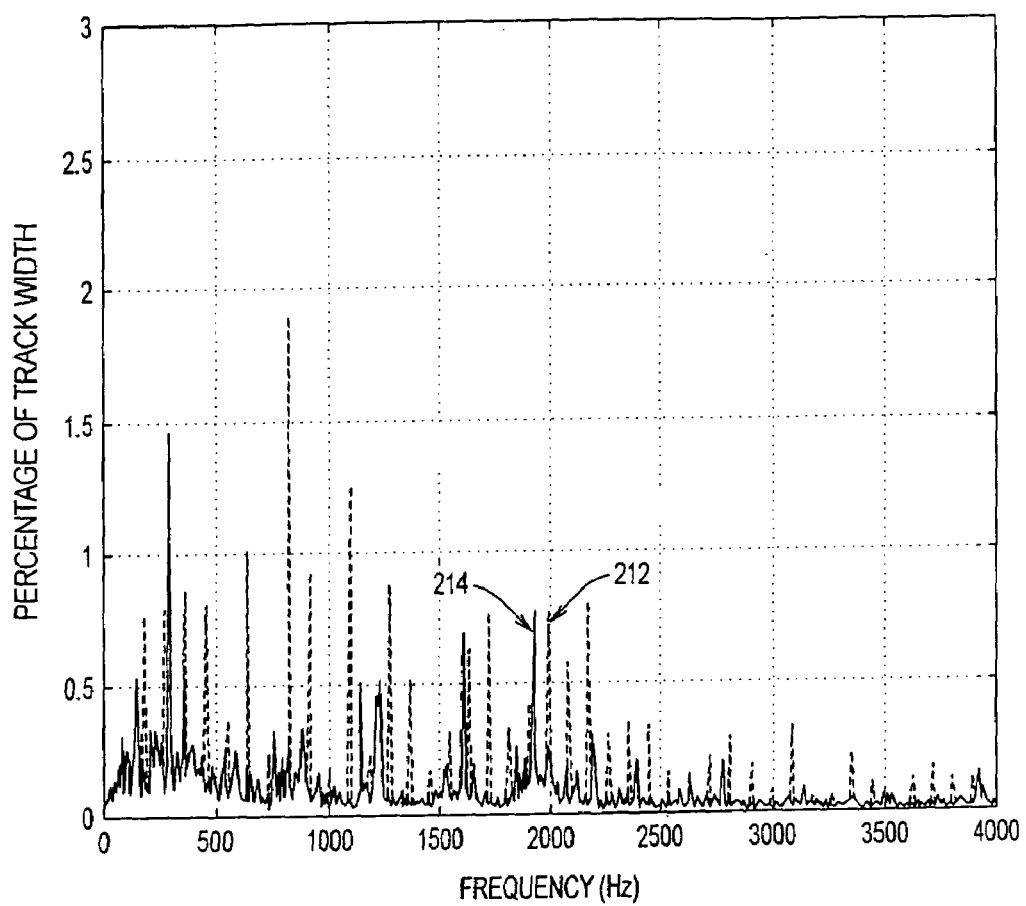
FIG. 5 shows a decomposition plot for the position error signal where a disturbance signal due to a rocking mode of the disk drive is attenuated.

FIG. 5 shows a decomposition plot for the position error signal in the disk drive 100 where the disturbance signal is attenuated by the attenuator 200. The decomposition plot is a Fourier Transform of the position error signal that includes the RRO disturbance signal 212 and the NRRO disturbance signal 214. As is seen, the attenuator 200 provides selective attenuation of the RRO disturbance signal 212 and the NRRO disturbance signal 214 over the rocking mode frequency range at about 1.9 KHz and therefore improves the position error signal when the target disturbance is present.

Figure 6:
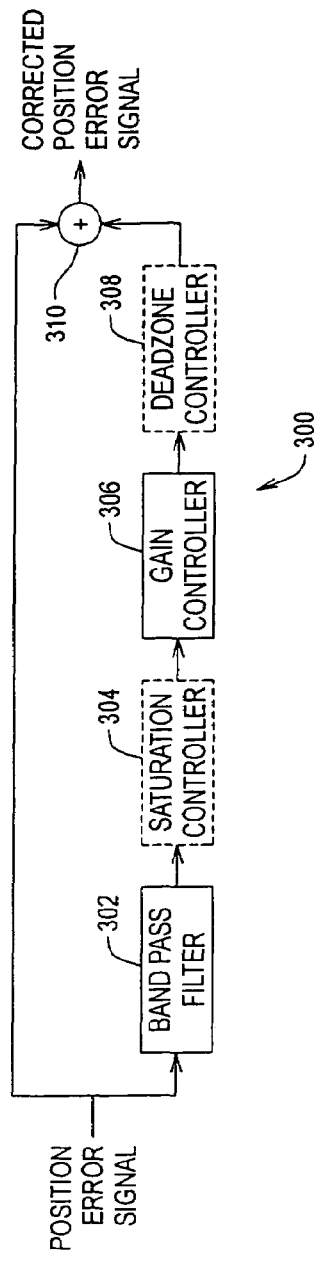
FIG. 6 shows the attenuator with a saturation controller and a deadzone controller.

FIG. 6 shows an attenuator 300 for non-linear filtering of a narrow-band disturbance signal in a position error signal of the disk drive 100.

The attenuator 300 includes a band pass filter 302, an optional saturation controller 304, a gain controller 306, an optional deadzone controller 308 and a combiner 310.

The band pass filter 302, the gain controller 306 and the combiner 310 are similar to the band pass filter 202, the gain controller 204 and the combiner 206, respectively.

The saturation contoller 304 preserves servo loop stability by limiting the output of the attenuator 300, which may grow very large due to the cubic function $f(u)$ provided by the gain controller 306. Thus, the saturation controller 304 limits the effect of the cubic function $f(u)$ to maintain servo loop stability. The saturation controller 304 imposes upper and lower limits on an input signal. If the input signal is within the upper and lower limits then the input signal passes through the saturation controller 304 unchanged. However, if the input signal is outside the upper and lower limits then the saturation controller 304 clips the input signal to the upper or lower limit. The saturation controller 304 can be implemented as an ASIC, firmware, program instructions for execution by a CPU, etc.

The deadzone controller 308 preserves the position error signal by eliminating the effect of the cubic function ƒ(u) when the target disturbance is very small. Thus, the deadzone controller 308 blocks the effect of the cubic function ƒ(u) if the target disturbance is negligible. The deadzone controller 308 creates a deadzone (region of zero output) by integer division of fixed-point digital signal processing. If the input signal is within the deadzone then the output signal is zero. However, if the input signal is outside the deadzone then the output signal is a linear function of the input signal with a slope of 1. The deadzone controller 308 can be implemented as an ASIC, firmware, program instructions for execution by a CPU, etc.

The saturation controller 304 and the deadzone controller 308 can be placed in a different order than that shown in the attenuator 300.

Figure 7:
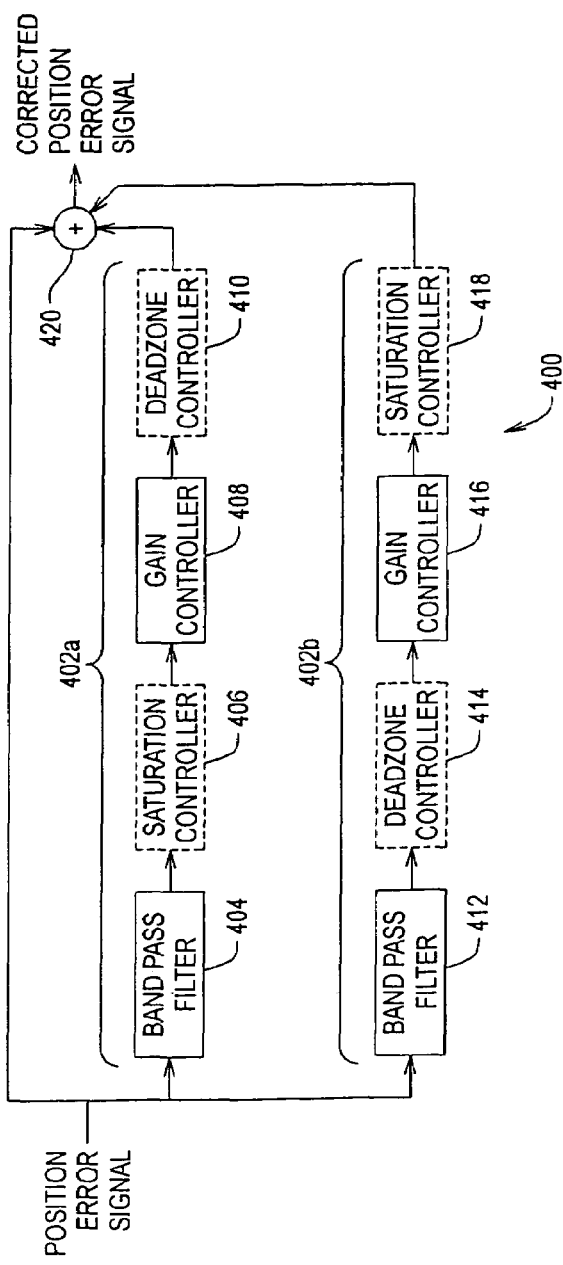
FIG. 7 shows the attenuator with multiple filter branches.

FIG. 7 shows an attenuator 400 for non-linear filtering of a narrow-band disturbance signal in a position error signal of the disk drive 100.

The attenuator 400 includes filter branches 402a and 402b and a combiner 420 The filter branches 402a and 402b each receive the position error signal, and the combiner 420 combines the position error signal with the correction signals from the filter branches 402a and 402b to generate the corrected position error signal.

The filter branch 402a includes a band pass filter 404, an optional saturation controller 406, a gain controller 408 and an optional deadzone controller 410 that are similar to the band pass filter 302, the saturation controller 304, the gain controller 306 and the deadzone controller 308, respectively. Likewise, the filter branch 402b includes a band pass filter 412, an optional deadzone controller 414, a gain controller 416 and an optional saturation controller 418 that are similar to the band pass filter 302, the deadzone controller 308, the gain controller 306 and the saturation controller 304, respectively. In addition, the combiner 420 is similar to the combiner 310.

The attenuator 400 attenuates the disturbance signal at multiple peak frequencies. For example, the band pass filters 404 and 412 have different base frequencies, the gain controllers 408 and 416 have different non-linear gain functions, the saturation controllers 406 and 418 are different and the deadzone controllers 410 and 414 are different. Further, the filter branches 402a and 402b can operate in parallel or operate selectively in response to the disturbance signal peaks.

The attenuators 200, 300 and 400 can generate the correction signals when the servo controller 122 enters on-track mode (after a seek to a target track and while tracking the target track). By careful tuning through simulation, the transient response shows virtually no difference when the cubic function ƒ(u) is operating.

Advantageously, the present invention provides selective attenuation of the position error due to narrow-band disturbances in the position error signal by a non-linear gain function for automatic adjustment of the disturbance signal in the position error signal depending on the disturbance signal amplitude. The combined non-linear gain and narrow-band peak filtering confine the non-linear effect to a predetermined frequency range. Further, in the cubic function ƒ(u), the parameter N for the threshold level of the disturbance signal amplification/attenuation and the parameter M for setting the overall attenuation level are selectable based on desired performance criteria.

As will be appreciated by those skilled in the art, in addition to the logic blocks shown in the drawings, the various methods and architectures described herein can be implemented as computer instructions for execution by a microprocessor, ASICs, firmware, logic circuits, etc. For example, the above steps and functions can reside as firmware in the servo controller 122 or as a logic circuit in the drive controller 124.

Although example embodiments of the present invention are described in connection with a disk drive servo system, it should be noted that the present invention is not limited to disk drives.

The present invention has been described in considerable detail with reference to certain preferred versions thereof, however other versions are possible. For example, although a cubic function has been described, other odd functions such as a $5^{th}$ order odd function can also be used. Therefore, the spirit and scope of the appended claims should not be limited to the description of the preferred versions contained herein.

What is claimed is:

1. A method for operating a servo system including a first member and a second member that is positionable relative to the first member, the method comprising:

generating a position error signal to cause the second member to be positioned at a desired location relative to the first member; and reducing a position error in the position error signal by non-linear attenuation, wherein the position error is due to a disturbance in the servo system, the disturbance generates a disturbance signal in the position error signal, reducing the position error includes selectively adjusting the disturbance signal as a function of the amplitude of the disturbance signal and the function has a first selectable parameter N representing a threshold level for non-linear signal level adjustment such that adjusting the disturbance signal is a non-linear function of the ratio of the amplitude of the disturbance signal and the parameter N.

2. The method of claim 1, wherein the function has a second selectable parameter M representing a signal adjustment factor.

3. The method of claim 2, wherein the function is a cubic function.

4. The method of claim 3, wherein the function is:

$$f(u) = M\left(\frac{u}{N}\right)^3,$$

u represents the amplitude of the disturbance signal.

5. The method of claim 4, wherein the function selectively amplifies or attenuates the disturbance signal depending on the ratio u/N.

6. The method of claim 1, wherein the function is an odd function.

7. The method of claim 1, including:

filtering the position error signal to selectively pass the disturbance signal;

generating a correction signal having an amplitude that varies as a non-linear function of the amplitude of the disturbance signal; and combining the correction signal with the position error signal to generate a corrected position error signal, thereby reducing the position error in the position error signal.

8. The method of claim 7, wherein filtering the position error signal includes determining the frequency band of the disturbance signal.

9. The method of claim 8, wherein filtering the position error signal includes using a peak filter based on the frequency band of the disturbance signal.

10. The method of claim 7, wherein filtering the position error signal includes:
determining the frequency band and amplitude range of the disturbance signal; and
filtering the position error signal using a peak filter based on the frequency band and amplitude range of the disturbance signal.

11. The method of claim 7, wherein the amplitude of the correction signal increases as a non-linear function of the amplitude of the disturbance signal.

12. A servo system comprising:
a first member;
a second member positionable relative to the first member; and
a control loop including:
a servo controller that generates a position error signal to cause the second member to be positioned at a desired location relative to the first member; and
an attenuator that selectively reduces a position error in the position error signal by non-linear filtering, wherein the position error is due to a disturbance in the servo system, the disturbance generates a disturbance signal in the position error signal, the attenuator includes a gain controller that adjusts the disturbance signal as a non-linear function of the amplitude of the disturbance signal and the function has a first selectable parameter N representing a threshold level for non-linear signal level adjustment such that the gain controller adjusts the disturbance signal as a non-linear function of the ratio of the amplitude of the disturbance signal and the parameter N.

13. The servo system of claim 12, wherein the function has a second selectable parameter M representing a signal adjustment factor.

14. The servo system of claim 13, wherein the function is a cubic function.

15. The servo system of claim 14, wherein the function:

$$f(u) = M\left(\frac{u}{N}\right)^3,$$

u represents the amplitude of the disturbance signal.

16. The servo system of claim 15, wherein the function selectively amplifies or attenuates the disturbance signal depending on the ratio u/N.

17. The servo system of claim 12, wherein the function is an odd function.

18. The servo system of claim 12, wherein the attenuator includes:
a filter that filters the position error signal to selectively pass the disturbance signal;
a gain controller that generates a correction signal having an amplitude that varies as a non-linear function of the amplitude of the disturbance signal; and
a combiner that combines the correction signal with the position error signal to generate a corrected position error signal.

19. The servo system of claim 18, wherein the filter is a band pass filter.

20. The servo system of claim 18, wherein the filter is a peak filter based on the frequency band of the disturbance signal.

21. The servo system of claim 18, wherein the filter is a peak filter based on the frequency band and amplitude range of the disturbance signal.

22. The servo system of claim 18, wherein the amplitude of the correction signal increases as a non-linear function of the amplitude of the disturbance signal.

23. The servo system of claim 18, wherein:
the position error signal includes multiple peaks at different frequencies; and
the attenuator includes:
a first filter that filters the position error signal to selectively pass a first disturbance signal at a first peak frequency;
a first gain controller that generates a first correction signal having an amplitude that varies as a non-linear function of the amplitude of the first disturbance signal;
a second filter that filters the position error signal to selectively pass a second disturbance signal at a second peak frequency;
a second gain controller that generates a second correction signal having an amplitude that varies as a non-linear function of the amplitude of the second disturbance signal; and
a combiner that combines the first and the second correction signals with the position error signal to generate a corrected position error signal, thereby reducing the position error in the position error signal.

24. The servo system of claim 18, wherein the attenuator includes a saturation controller that limits the corrected position error signal to preserve servo loop stability as the correction signal increases above a threshold.

25. The servo system of claim 18, wherein the attenuator includes a deadzone controller that filters the corrected position error signal to preserve servo loop stability as the correction signal decreases below a threshold.

26. A disk drive comprising:
a disk for storing information in tracks;
a transducer positionable over the tracks for reading information therefrom; and
a control loop including:
a servo controller that generates a position error signal to cause the transducer to be positioned relative to a desired track on the disk; and
an attenuator that selectively reduces a position error in the position error signal by non-linear attenuation, wherein the position error is due to a disturbance in the disk drive, the disturbance generates a disturbance signal in the position error signal, the attenuator includes a gain controller that adjusts the disturbance signal as a non-linear function of the amplitude of the disturbance signal and the function has a first selectable parameter N representing a threshold level for non-linear signal adjustment such that the gain controller adjusts the disturbance signal as a non-linear function of the ratio of the amplitude of the disturbance signal and the parameter N.

27. The disk drive of claim 26, wherein the function has a second selectable parameter M representing a signal adjustment factor.

28. The disk drive of claim 27, wherein the function is a cubic function.

29. The disk drive of claim 28, wherein the function:

$$f(u) = M\left(\frac{u}{N}\right)^3,$$

u represents the amplitude of the disturbance signal.

30. The disk drive of claim 29, wherein the function selectively amplifies or attenuates the disturbance signal depending on the ratio u/N.

31. The disk drive of claim 26, wherein the function is an odd function.

32. The disk drive of claim 26, wherein the attenuator includes:
   a filter that filters the position error signal to selectively pass the disturbance signal;
   a gain controller that generates a correction signal having an amplitude that varies as a non-linear function of the amplitude of the disturbance signal; and
   a combiner that combines the correction signal with the position error signal to generate a corrected position error signal.

33. The disk drive of claim 32, wherein the filter is a band pass filter.

34. The disk drive of claim 32, wherein the filter is a peak filter based on the frequency band of the disturbance signal.

35. The disk drive of claim 32, wherein the filter is a peak filter based on the frequency band and amplitude range of the disturbance signal.

36. The disk drive of claim 32, wherein the amplitude of the correction signal increases as a non-linear function of the amplitude of the disturbance signal.

37. The disk drive of claim 32, wherein the attenuator includes a saturation controller that limits the corrected position error signal to preserve servo loop stability as the correction signal increases above a threshold.

38. The disk drive of claim 32, wherein the attenuator includes a deadzone controller that filters the output signal of the attenuator to preserve servo loop stability as the gain controller output signal decreases below a threshold.

39. The disk drive of claim 32, wherein the attenuator includes:
   a saturation controller that limits the corrected position error signal to preserve servo loop stability as the correction signal increases above a threshold; and
   a deadzone controller that filters the output signal of the attenuator to preserve servo loop stability as the gain controller output signal decreases below a threshold.

40. The disk drive of claim 26, wherein the disturbance is a random disturbance.

41. The disk drive of claim 40, wherein the random disturbance is non-repeatable run out.

42. The disk drive of claim 41, wherein the non-repeatable run out is due to a rocking mode excited by a spindle motor bearing.

43. A method for operating a servo system including a first member and a second member that is positionable relative to the first member, the method comprising:
   generating a position error signal to cause the second member to be positioned at a desired location relative to the first member; and
   reducing a position error in the position error signal by non-linear attenuation, wherein the position error is due to a disturbance in the servo system, the disturbance generates a disturbance signal in the position error signal and reducing the position error includes selectively adjusting the disturbance signal as an odd function of the amplitude of the disturbance signal.

44. A method for operating a servo system including a first member and a second member that is positionable relative to the first member, the method comprising:
   generating a position error signal to cause the second member to be positioned at a desired location relative to the first member;
   reducing a position error in the position error signal by non-linear attenuation, wherein the position error is due to a disturbance in the servo system and the disturbance generates a disturbance signal in the position error signal;
   determining the frequency band and amplitude range of the disturbance signal;
   filtering the position error signal using a peak filter based on the frequency band and amplitude range of the disturbance signal to selectively pass the disturbance signal;
   generating a correction signal having an amplitude that varies as a non-linear function of the amplitude of the disturbance signal; and
   combining the correction signal with the position error signal to generate a corrected position error signal, thereby reducing the position error in the position error signal.

45. A servo system comprising:
   a first member;
   a second member positionable relative to the first member; and
   a control loop including:
      a servo controller that generates a position error signal to cause the second member to be positioned at a desired location relative to the first member; and
      an attenuator that selectively reduces a position error in the position error signal by non-linear filtering, wherein the position error is due to a disturbance in the servo system, the disturbance generates a disturbance signal in the position error signal and the attenuator includes a gain controller that adjusts the disturbance signal as a non-linear odd function of the amplitude of the disturbance signal.

46. A servo system comprising:
   a first member;
   a second member positionable relative to the first member; and
   a control loop including:
      a servo controller that generates a position error signal to cause the second member to be positioned at a desired location relative to the first member; and
      an attenuator that selectively reduces a position error in the position error signal by non-linear filtering, wherein the position error is due to a disturbance in the servo system, the disturbance generates a disturbance signal in the position error signal and the attenuator includes:
         a peak filter that filters the position error signal based on the frequency band and amplitude range of the disturbance signal to selectively pass the disturbance signal;

a gain controller that generates a correction signal having an amplitude that varies as a non-linear function of the amplitude of the disturbance signal; and
a combiner that combines the correction signal with the position error signal to generate a corrected position error signal.

47. A servo system comprising:
a first member;
a second member positionable relative to the first member; and
a control loop including:
a servo controller that generates a position error signal to cause the second member to be positioned at a desired location relative to the first member; and
an attenuator that selectively reduces a position error in the position error signal by non-linear filtering, wherein the position error is due to a disturbance in the servo system, the disturbance generates a disturbance signal in the position error signal and the attenuator includes:
a filter that filters the position error signal to selectively pass the disturbance signal;
a gain controller that generates a correction signal having an amplitude that varies as a non-linear function of the amplitude of the disturbance signal;
a combiner that combines the correction signal with the position error signal to generate a corrected position error signal; and
a saturation controller that limits the corrected position error signal to preserve servo loop stability as the correction signal increases above a threshold.

48. A servo system comprising:
a first member;
a second member positionable relative to the first member; and
a control loop including:
a servo controller that generates a position error signal to cause the second member to be positioned at a desired location relative to the first member; and
an attenuator that selectively reduces a position error in the position error signal by non-linear filtering, wherein the position error is due to a disturbance in the servo system, the disturbance generates a disturbance signal in the position error signal and the attenuator includes:
a filter that filters the position error signal to selectively pass the disturbance signal;
a gain controller that generates a correction signal having an amplitude that varies as a non-linear function of the amplitude of the disturbance signal;
a combiner that combines the correction signal with the position error signal to generate a corrected position error signal; and
a deadzone controller that filters the output signal of the attenuator to preserve servo loop stability as the gain controller output signal decreases below a threshold.

49. A disk drive comprising:
a disk for storing information in tracks;
a transducer positionable over the tracks for reading information therefrom; and
a control loop including:
a servo controller that generates a position error signal to cause the transducer to be positioned relative to a desired track on the disk; and
an attenuator that selectively reduces a position error in the position error signal by non-linear attenuation, wherein the position error is due to a disturbance in the disk drive, the disturbance generates a disturbance signal in the position error signal and the attenuator includes a gain controller that adjusts the disturbance signal as a non-linear odd function of the amplitude of the disturbance signal.

50. A disk drive comprising:
a disk for storing information in tracks;
a transducer positionable over the tracks for reading information therefrom; and
a control loop including:
a servo controller that generates a position error signal to cause the transducer to be positioned relative to a desired track on the disk; and
an attenuator that selectively reduces a position error in the position error signal by non-linear attenuation, wherein the position error is due to a disturbance in the disk drive, the disturbance generates a disturbance signal in the position error signal and the attenuator includes:
a peak filter that filters the position error signal based on the frequency band and amplitude range of the disturbance signal to selectively pass the disturbance signal;
a gain controller that generates a correction signal having an amplitude that varies as a non-linear function of the amplitude of the disturbance signal; and
a combiner that combines the correction signal with the position error signal to generate a corrected position error signal.

51. A disk drive comprising:
a disk;
a transducer for reading from and writing to the disk;
a servo controller that generates a position error signal that includes a disturbance signal, wherein the disturbance signal is due to a disturbance and causes a position error in the position error signal; and
an attenuator that includes a band pass filter, a gain controller and a combiner, wherein the band pass filter generates the disturbance signal by narrow-band filtering the position error signal, the gain controller generates a correction signal by applying a non-linear function to the disturbance signal, the function has a first selectable parameter N representing a threshold level for non-linear signal adjustment to adjust the disturbance signal as a non-linear function of the ratio of the amplitude of the disturbance signal and the parameter N, the combiner generates a corrected position error signal by summing the position error signal and the correction signal, the corrected position error signal has less of the position error than the position error signal has and the transducer is positioned relative to the disk by the corrected position error signal.

52. The disk drive of claim 51, wherein the attenuator includes a saturation controller that clips the correction signal if the amplitude of the correction signal is above a threshold.

53. The disk drive of claim 51, wherein the attenuator includes a deadzone controller that blocks the correction signal if the amplitude of the correction signal is below a threshold.

54. The disk drive of claim 51, wherein the attenuator generates the correction signal in response to the servo controller entering on-track mode.

55. The disk drive of claim 51, wherein the function is an odd function.

56. The disk drive of claim 55, wherein the function is a cubic function.

57. The disk drive of claim 56, wherein the function is:

$$f(u) = M\left(\frac{u}{N}\right)^3$$

M represents a signal adjustment factor; and
u represents the amplitude of the disturbance signal.

58. The disk drive of claim 51, wherein the disturbance is a random disturbance.

59. The disk drive of claim 58, wherein the random disturbance is non-repeatable run out.

60. The disk drive of claim 59, wherein the non-repeatable run out is due to a rocking mode excited by a spindle motor bearing.

61. A disk drive comprising:
a disk;
a transducer for reading from and writing to the disk;
a servo controller that generates a position error signal that includes a disturbance signal, wherein the disturbance signal is due to a disturbance and causes a position error in the position error signal; and
an attenuator that includes a band pass filter, a gain controller and a combiner, wherein the band pass filter generates the disturbance signal by narrow-band filtering the position error signal, the gain controller generates a correction signal by applying a non-linear odd function to the disturbance signal, the combiner generates a corrected position error signal by summing the position error signal and the correction signal, the corrected position error signal has less of the position error than the position error signal has and the transducer is positioned relative to the disk by the corrected position error signal.

62. The disk drive of claim 61, wherein the attenuator includes a saturation controller that clips the correction signal if the amplitude of the correction signal is above a threshold.

63. The disk drive of claim 61, wherein the attenuator includes a deadzone controller that blocks the correction signal if the amplitude of the correction signal is below a threshold.

64. The disk drive of claim 61, wherein the attenuator generates the correction signal in response to the servo controller entering on-track mode.

65. The disk drive of claim 61, wherein the function is a $5^{th}$ order function.

66. The disk drive of claim 61, wherein the function is a cubic function.

67. The disk drive of claim 66, wherein the function is:

$$f(u) = M\left(\frac{u}{N}\right)^3$$

N represents a threshold level for non-linear signal adjustment;
M represents a signal adjustment factor; and
u represents the amplitude of the disturbance signal.

68. The disk drive of claim 61, wherein the disturbance is a random disturbance.

69. The disk drive of claim 68, wherein the random disturbance is non-repeatable run out.

70. The disk drive of claim 69, wherein the non-repeatable run out is due to a rocking mode excited by a spindle motor bearing.

71. A disk drive comprising:
a disk;
a transducer for reading from and writing to the disk;
a servo controller that generates a position error signal that includes a disturbance signal, wherein the disturbance signal is due to a disturbance and causes a position error in the position error signal; and
an attenuator that includes a peak filter, a gain controller and a combiner, wherein the peak filter generates the disturbance signal by narrow-band filtering the position error signal based on the frequency band and amplitude range of the disturbance signal, the gain controller generates a correction signal by applying a non-linear function to the disturbance signal, the combiner generates a corrected position error signal by summing the position error signal and the correction signal, the corrected position error signal has less of the position error than the position error signal has and the transducer is positioned relative to the disk by the corrected position error signal.

72. The disk drive of claim 71, wherein the attenuator includes a saturation controller that clips the correction signal if the amplitude of the correction signal is above a threshold.

73. The disk drive of claim 71, wherein the attenuator includes a deadzone controller that blocks the correction signal if the amplitude of the correction signal is below a threshold.

74. The disk drive of claim 71, wherein the attenuator generates the correction signal in response to the servo controller entering on-track mode.

75. The disk drive of claim 71, wherein the function is an odd function.

76. The disk drive of claim 75, wherein the function is a cubic function.

77. The disk drive of claim 76, wherein the function is:

$$f(u) = M\left(\frac{u}{N}\right)^3$$

N represents a threshold level for non-linear signal adjustment;
M represents a signal adjustment factor; and
u represents the amplitude of the disturbance signal.

78. The disk drive of claim 71, wherein the disturbance is a random disturbance.

79. The disk drive of claim 78, wherein the random disturbance is non-repeatable run out.

80. The disk drive of claim 79, wherein the non-repeatable run out is due to a rocking mode excited by a spindle motor bearing.

81. A disk drive comprising:
a disk;
a transducer for reading from and writing to the disk;
a servo controller that generates a position error signal that includes a disturbance signal, wherein the disturbance signal is due to a disturbance and causes a position error in the position error signal; and an attenuator that includes a band pass filter, a gain controller, a saturation controller and a combiner, wherein the band pass filter generates the disturbance signal by narrow-band filtering the position error signal, the gain controller generates a correction signal by applying a non-linear function to the disturbance signal, the saturation controller clips the correction signal if the amplitude of the correction signal is above a threshold, the combiner generates a corrected position error signal by summing the position error signal and the correction signal, the corrected position error signal has less of the position error than the position error signal has and the transducer is positioned relative to the disk by the corrected position error signal.

82. The disk drive of claim 81, wherein the saturation controller is between the band pass filter and the gain controller.

83. The disk drive of claim 81, wherein the saturation controller is between the gain controller and the combiner.

84. The disk drive of claim 81, wherein the attenuator generates the correction signal in response to the servo controller entering on-track mode.

85. The disk drive of claim 81, wherein the function is an odd function.

86. The disk drive of claim 85, wherein the function is a cubic function.

87. The disk drive of claim 86, wherein the function is:

$$f(u) = M\left(\frac{u}{N}\right)^3$$

N represents a threshold level for non-linear signal adjustment;

M represents a signal adjustment factor; and u represents the amplitude of the disturbance signal.

88. The disk drive of claim 81, wherein the disturbance is a random disturbance.

89. The disk drive of claim 88, wherein the random disturbance is non-repeatable run out.

90. The disk drive of claim 89, wherein the non-repeatable run out is due to a rocking mode excited by a spindle motor bearing.

91. A disk drive comprising:

a disk;

a transducer for reading from and writing to the disk;

a servo controller that generates a position error signal that includes a disturbance signal, wherein the disturbance signal is due to a disturbance and causes a position error in the position error signal; and an attenuator that includes a band pass filter, a gain controller, a deadzone controller and a combiner, wherein the band pass filter generates the disturbance signal by narrow-band filtering the position error signal, the gain controller generates a correction signal by applying a non-linear function to the disturbance signal, the deadzone controller blocks the correction signal if the amplitude of the correction signal is below a threshold, the combiner generates a corrected position error signal by summing the position error signal and the correction signal, the corrected position error signal has less of the position error than the position error signal has and the transducer is positioned relative to the disk by the corrected position error signal.

92. The disk drive of claim 91, wherein the deadzone controller is between the band pass filter and the gain controller.

93. The disk drive of claim 91, wherein the deadzone controller is between the gain controller and the combiner.

94. The disk drive of claim 91, wherein the attenuator generates the correction signal in response to the servo controller entering on-track mode.

95. The disk drive of claim 91, wherein the function is an odd function.

96. The disk drive of claim 95, wherein the function is a cubic function.

97. The disk drive of claim 96, wherein the function is:

$$f(u) = M\left(\frac{u}{N}\right)^3$$

N represents a threshold level for non-linear signal adjustment;

M represents a signal adjustment factor; and u represents the amplitude of the disturbance signal.

98. The disk drive of claim 91, wherein the disturbance is a random disturbance.

99. The disk drive of claim 98, wherein the random disturbance is non-repeatable run out.

100. The disk drive of claim 99, wherein the non-repeatable run out is due to a rocking mode excited by a spindle motor bearing.

* * * * *